United States Patent [19]
Yasuda et al.
[11] 4,409,599
[45] Oct. 11, 1983

[54] PRINTING CONTROL DEVICE FOR THERMAL PRINTER

[75] Inventors: Takeshi Yasuda, Fussa; Kazuyoshi Watanabe, Tokyo, both of Japan

[73] Assignee: Casio Computer Co., Ltd., Tokyo, Japan

[21] Appl. No.: 310,840

[22] Filed: Oct. 13, 1981

[30] Foreign Application Priority Data

Oct. 27, 1980 [JP] Japan ................................ 55-149285
Oct. 27, 1980 [JP] Japan ................................ 55-149286

[51] Int. Cl.[3] ............................................ G01D 15/10
[52] U.S. Cl. ................................ 346/76 PH; 219/216
[58] Field of Search ........................ 346/76 R, 76 PH; 400/120; 219/216, 216 PH

[56] References Cited

U.S. PATENT DOCUMENTS 3,975,707 8/1976 Ito et al. .................. 219/216 PH X
4,020,465 4/1977 Cochran et al. ........... 346/76 PH X
4,149,171 4/1979 Sato et al. ................. 346/76 PH X
4,224,869 9/1980 Morin ........................ 346/76 PH X

FOREIGN PATENT DOCUMENTS 57-11784 3/1982 Japan .

*Primary Examiner*—Donald A. Griffin
*Attorney, Agent, or Firm*—Frishauf, Holtz, Goodman & Woodward

[57] ABSTRACT

In a printing control device for a thermal printer, a character read out from a character buffer for storing characters to be printed is supplied to a decoder and is then output from a character generator as a dot signal. In response to the dot signal from the character generator, an on-time preparing circuit outputs an on-time signal having a time duration determined by the number of dots associated with the dot signal or by the number of characters determined by the number of dot patterns. A voltage is applied to printing elements of a printing head for performing a printing operation for a time period determined by the duration of the on-time signal from the on-time signal preparing circuit.

12 Claims, 13 Drawing Figures

F I G. 7
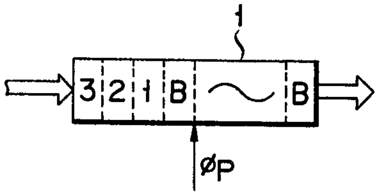
F I G. 8(A)
F I G. 8(B)
F I G. 8(C)
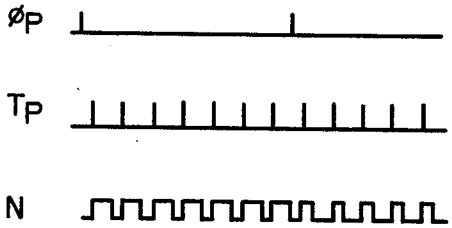
F I G. 8(D)
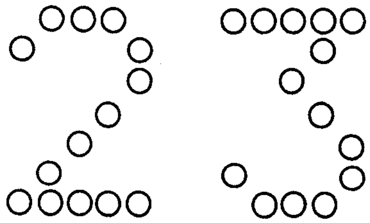

PRINTING CONTROL DEVICE FOR THERMAL PRINTER

BACKGROUND OF THE INVENTION

The present invention relates to a printing control device for a thermal printer used with an electronic portable calculator.

A thermal printer has a slidable printing head having a number of printing elements. The printing head slides on a sheet of heat-sensitive paper to print characters or the like on it. To use such a thermal printer with an electronic portable calculator, the printing head must be supplied with a low voltage thereby to reduce power consumption.

When the voltage applied to the printing head is lowered due to use of a cell of small capacity, in printing a letter "H", for example, the "I" parts will be printed less distinct than the "−" part. This is because more printing elements must be heated to print either "I" part than to print the "−" part. That is, the more printing elements that are heated at the same time, the lower is the voltage that is applied to each of them. This unwanted phenomenon is promoted because a considerable voltage drop occurs due to resistances in a common line connecting the printing elements to the cell when the voltage is applied to the printing head.

When the voltage applied to each printing element is the lowest possible, however, the printing elements are not sufficiently heated when the printing head begins printing characters or the like on the first line. Inevitably a first few characters or the like will be insufficiently distinct unlike the others on the first line. As a result, due to their different distinctnesses, the characters or the like appear unattractive.

SUMMARY OF THE INVENTION

It is an object of the present invention to provide a printing control device for a thermal printer, which eliminates the above-mentioned drawbacks of the prior art devices, which lowers the supply voltage of a thermal printing head to the lowest possible value, and which helps print characters or the like of uniform distinctness.

In order to achieve the above-mentioned object, the present invention provides a printing control device comprising buffer means for storing data to be printed, character generating means which is connected to said buffer means and which outputs a dot pattern signal corresponding to a character read out from said buffer means, an on-time preparing circuit which is connected to said character generating means and which outputs an on-time signal of a predetermined duration in response to the dot pattern signal from said character generating means and a printing head section which is connected to said character generating means and to said on-time preparing circuit and which includes a plurality of printing elements, those of said printing elements which correspond to the dot pattern signal of said character generating means being applied with a voltage for a period of time which corresponds to the duration of the output on-time signal from said on-time operating circuit.

The on-time preparing circuit can produce an on-time signal of a duration corresponding to the number of printing elements of the printing head, which are to print dots of each column of a dot pattern represented by a dot pattern signal from the character generator. Thus, the more printing elements that are used to print dots of the same column, the longer they are heated. The dots of each character, figure or symbol printed will have the same distinctness.

Further, the on-time preparing circuit keeps on generating on-time signals having long durations until first few characters or the like are printed, so that a predetermined voltage is applied to the printing head for a long time to print each of these characters or the like. Thereafter the on-time preparing circuit generates on-time signals having short durations, so that the voltage is applied to the printing head for a short time to print one character or the like. This method of applying voltage makes it possible to print characters or the like of uniform distinctness, which therefore appear attractive. Since the voltage to be applied to the printing element need not be high, various advantages are obtained including lower power consumption.

BRIEF DESCRIPTION OF THE DRAWINGS

FIG. 7 is a view showing the manner in which the character buffer shown in FIG. 1 stores data; and FIGS. 8A to 8D are timing charts for explaining the printing operation of the data stored in the character buffer shown in FIG. 7, and a view showing the printed condition of the data.

DETAILED DESCRIPTION OF THE PREFERRED EMBODIMENTS

Figure 1:
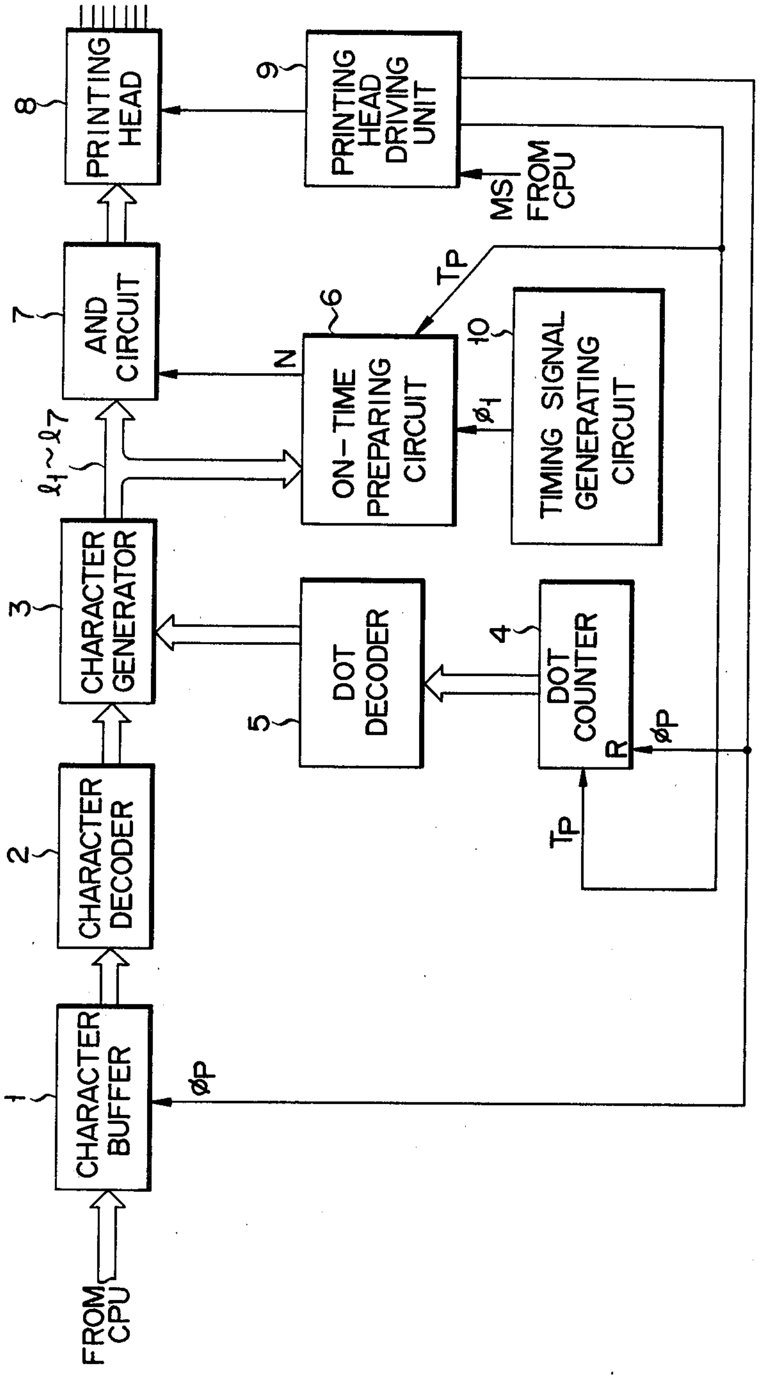
FIG. 1 is a block diagram of a printing control device for a thermal printer according to an embodiment of the present invention as applied to an electronic portable calculator.

The preferred embodiments of the present invention will now be described with reference to the accompanying drawings. FIG. 1 is a schematic block diagram showing a printing control device for a thermal printer according to the present invention as applied to an electronic portable calculator. Referring to FIG. 1, reference numeral 1 denotes a character buffer to which printing data for one line is input from a CPU (not shown) before initiating the printing of this line. A timing signal $\phi p$ is also input to the character buffer 1 upon termination of printing of each character. Upon input of the timing signal $\phi p$, the printing data for one character in the character buffer 1 is supplied to a character decoder 2. The character decoder 2 decodes the input printing data and outputs the decoded data to a character generator 3. A dot counter 4 counts printing position signals Tp and outputs the count to a dot decoder 5. When the count of the dot counter 4 becomes "7", representing the termination of printing for one character, the timing signal $\phi$p described above is input to an R input of the dot counter 4 to reset the count thereof to "0". The dot decoder 5 decodes the input count data and outputs the decoded data to the character generator 3.

The character generator 3 stores various character patterns such as numerals, the decimal point, letters and so on. The character generator 3 sequentially supplies 5×7 dot pattern signals corresponding to the data from the character decoder 2 to an on-time preparing circuit 6 and an AND circuit array 7. The on-time preparing circuit 6 outputs an on-time signal N to the AND circuit array 7 for a time period corresponding to the number of dots represented by each input dot pattern. While the on-time signal N is output, the dot signal is applied to a printing head 8 through the AND circuit array 7. The printing head 8 is driven by a printing head drive unit 9 and is moved in vertical direction. The printing head drive unit 9 has a motor, which starts rotating upon receipt of a motor start signal from the CPU, thereby to drive the printing head 8. This printing head 8 has seven printing elements $8_1$ to $8_7$ vertically arranged in a column. While the dot pattern signal is input, a predetermined voltage is applied to the corresponding printing elements and these printing elements are heated to perform dot printing on a recording paper sheet. Upon transverse displacement of the printing head 8 by one column, the printing head drive unit 9 outputs a printing position signal Tp. Upon transverse displacement of the printing head 8 by one digit (seven column), the printing head drive unit 9 outputs a timing signal $\phi$p. An on-time preparing signal $\phi$1 is supplied to the on-time preparing circuit 6 from a timing signal generating circuit 10.

Figure 2:
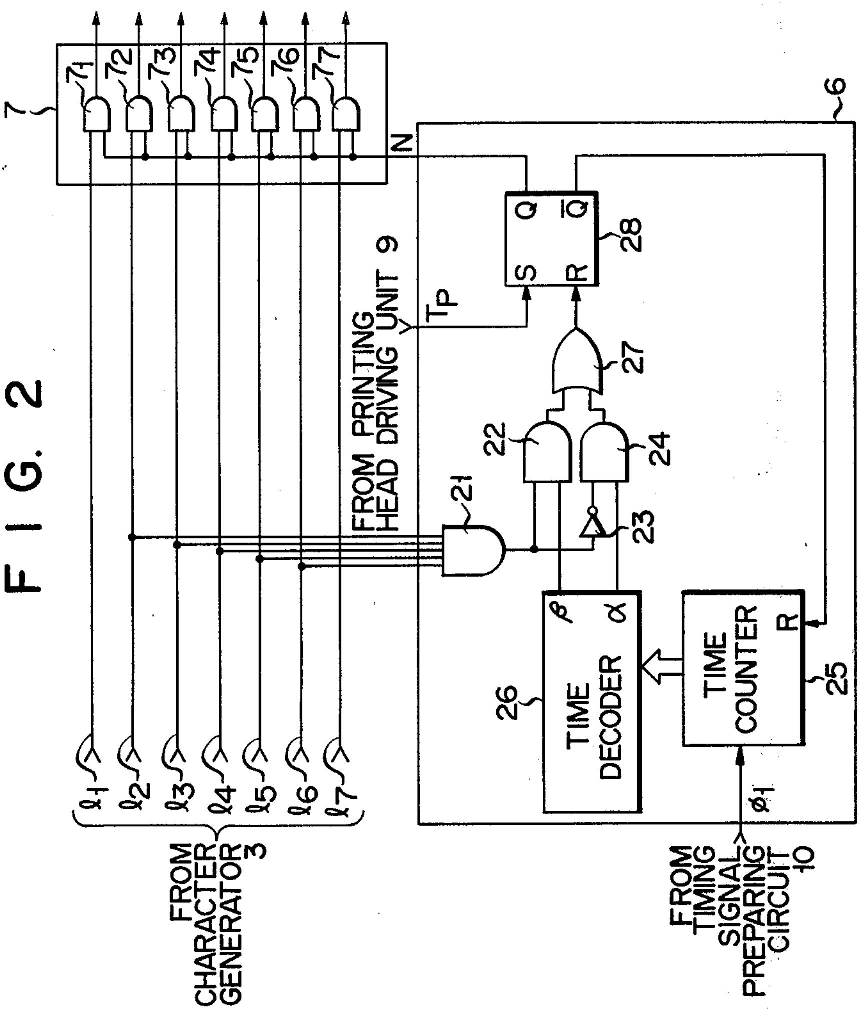
FIG. 2 is a circuit diagram showing an embodiment of the on-time preparing circuit shown in FIG. 1.

FIG. 2 is a circuit diagram showing in more detail the on-time preparing circuit 6 and the AND circuit array 7. Dot pattern signals output from the character generator 3 are input to corresponding AND circuits $7_1$ to $7_7$ through lines $l_1$ to $l_7$. Those dot pattern signals which have passed through the lines $l_2$ to $l_6$ are input to an AND circuit 21. The output of the AND circuit 21 is directly input to an AND circuit 22 and to an AND circuit 24 through an inverter 23. The on-time preparing signal $\phi$1 of a period shorter than that of the printing position signal Tp is input to a time counter 25. The time counter 25 counts the on-time preparing signals $\phi$1 and outputs the obtained count to a time decoder 26. When the count reaches a predetermined value $\alpha$, the time decoder 26 outputs a signal to the AND circuit 24. When the count reaches another predetermined value $\beta$ which is greater than the predetermined value $\alpha$, the time decoder 26 outputs a resetting signal to the AND circuit 22. A signal output from the AND circuit 22 or the AND circuit 24 is input as a resetting signal to the R input of an RS flip-flop (to be referred to as F/F for brevity hereinafter) 28 through an OR circuit 27. The printing position signal Tp is input to the S input of the F/F 28. Upon input of each pulse of the printing position signal Tp, the F/F 28 is set and an on-time signal N is output from its Q output to the respective AND circuits $7_1$ to $7_7$. Every time the resetting signal is input, a resetting signal is output from the $\overline{Q}$ side output end to clear the count of the time counter 25.

Figure 3A:
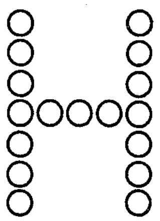
FIGS. 3A to 3C are views showing the relationship among a dot pattern, printing position signals Tp corresponding respectively to the columns of the dot pattern, and the on-time signal each corresponding to the number of dots in one column of the dot pattern.
Figure 3B:
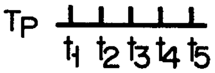

The mode of operation of the circuitry shown in FIGS. 1 and 2 will now be described. Data for one line is written in the character buffer 1 and the most significant digit of the character buffer 1 stores the data "H". When the printing head is moved from the position of the most significant digit and the timing signal $\phi$p is input to the character buffer 1, data "H" stored in the most significant digit of the character buffer 1 is read out and is input to the character generator 3 through the character decoder 2 as character address data. Simultaneously, the timing signal $\phi$p resets the dot counter 4. Then, as shown in FIG. 3B, a first signal t1 of the printing position signal Tp is generated and counted by the dot counter 4. The count data thus obtained is decoded by the dot decoder 5 and is input to the character generator 3 as dot address data. As a result of this, a dot signal "1111111" is output from the character generator 3 to the AND circuit array 7. Since the printing position signal Tp sets the F/F 28 shown in FIG. 2, the on-time signal N is output to the AND circuit array 7. Therefore, a predetermined voltage is applied to the printing elements $8_1$ to $8_7$ of the printing head 8 through the AND circuits $7_1$ to $7_7$. The output of the signal "1" from the $\overline{Q}$ output of the F/F 28 is simultaneously interrupted and the resetting of the time counter 25 is released, so that the time counter 25 counts the on-time preparing signals $\phi$1 and outputs the obtained count to the time decoder 26. Since the lines $l_1$ to $l_7$ are all at level "1" by the output of the dot pattern signal, the signal "1" is input to the AND circuit 22 through the AND circuit 21. When the count of the time counter 25 reaches the predetermined value $\beta$, the signal resets the F/F 28 through the AND circuit 22 and the OR circuit 27. Since the on-time signal N is continuously output for a constant period of time t$\beta$, the voltage is continuously applied to the printing elements $8_1$ to $8_7$ and the first column "I" of the letter "H" is printed on the recording paper sheet.

Figure 3C:
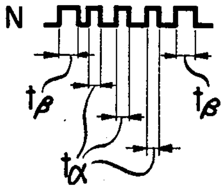

When a second signal t2 of the printing position signal Tp shown in FIG. 3B is output, the dot signal "0001000" for the second column of the letter "H" is output from the character generator 3. Simultaneously, the F/F 28 is set and the on-time signal N is output for the constant period of time t$\alpha$ as shown in FIG. 3C. Since the line $l_4$ alone is at level "1" by the output of the dot signal, the voltage is applied to the printing element $8_4$ alone. The signal "0" is output from the AND circuit 21, and the signal "1" is input to the AND circuit 24 through the inverter 23. When the count of the time counter 25 reaches the predetermined value $\alpha$, the signal from the time decoder 26 resets the F/F 28 through the AND circuit 24 and the OR circuit 27. Since the on-time signal N is kept output for a period of time t$\alpha$ which is shorter than the period of time t$\beta$ described above, the voltage is continuously applied to the printing element $8_4$ for this time period and the second column "—" of the letter "H" is printed on the recording paper sheet. When each of third and fourth signals t3 and t4 of the printing position signal Tp are output, the printing element $8_4$ alone is applied for the period of time t$\alpha$. When a fifth signal t5 of the printing position signal Tp is output, a voltage is applied to the printing elements $8_1$ to $8_7$ for the constant period of time t$\beta$, thus completing the printing of the letter "H" on the recording paper sheet.

Figure 4:
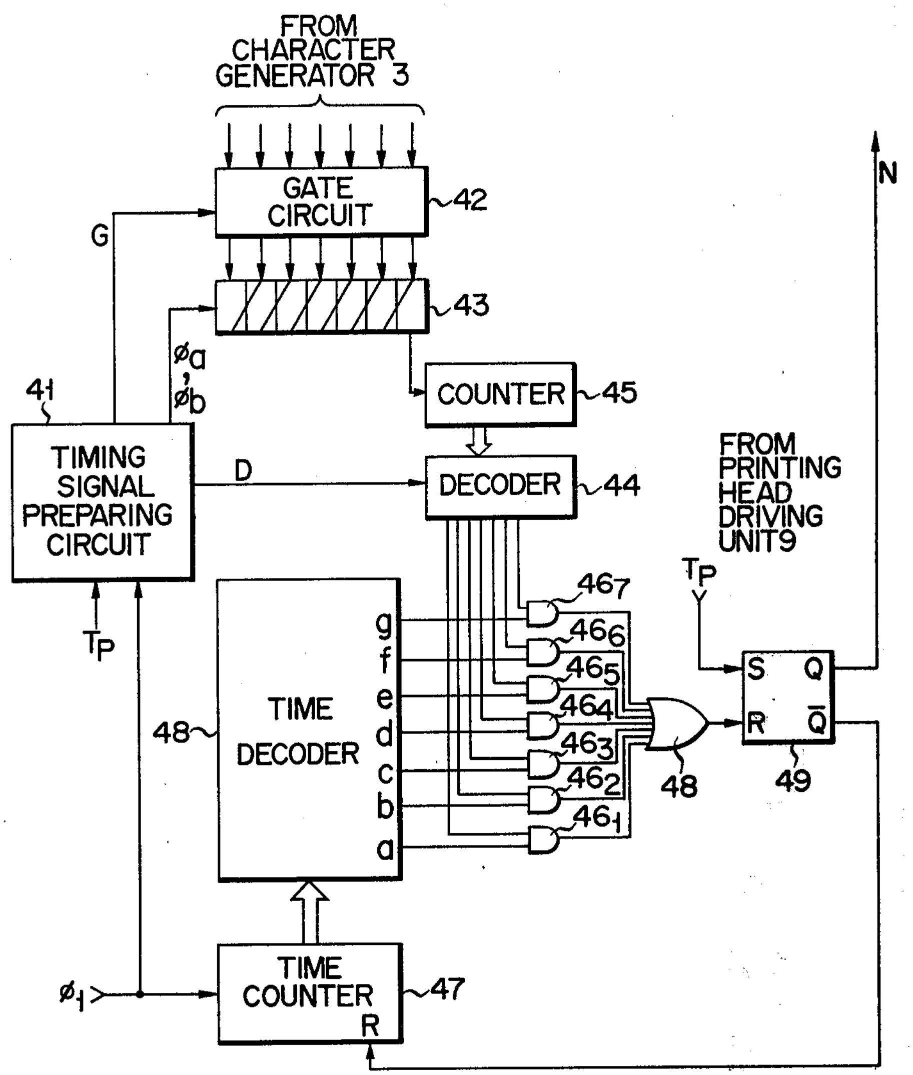
FIG. 4 is a circuit diagram showing another embodiment of the on-time preparing circuit shown in FIG. 1.
Figure 5:
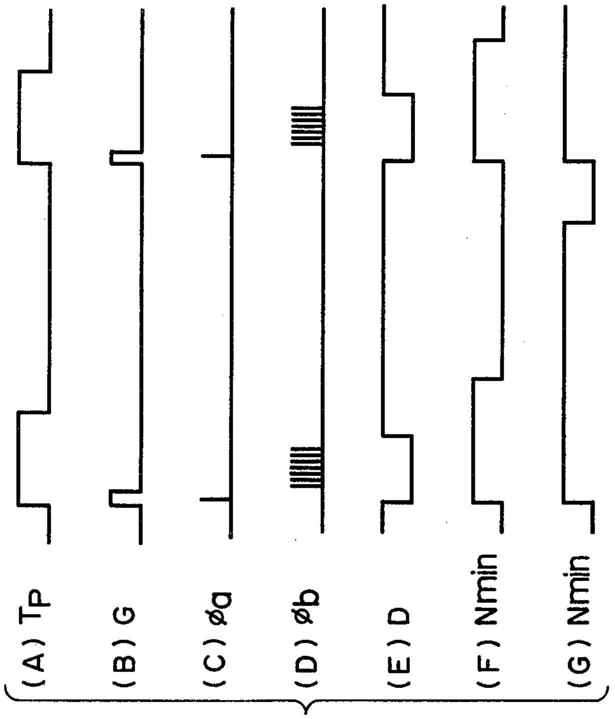
FIGS. 5A to 5G are timing charts for explaining the mode of operation of the on-time preparing circuit shown in FIG. 4.

FIG. 4 is a circuit diagram showing a second embodiment of the on-time preparing circuit 6. The printing position signal Tp and the on-time preparing signal $\phi$1 are input to a timing signal preparing circuit 41. When the printing position signal Tp is input to the timing signal preparing circuit 41 as shown in FIG. 5A, the timing signal preparing circuit 41 outputs a gate signal G shown in FIG. 5B to a gate circuit 42. Immediately after outputting the gate signal G, the timing signal preparing circuit 41 outputs a writing signal $\phi a$ shown in FIG. 5C to a shift register 43 and sequentially outputs seven shift signals $\phi b$ as shown in FIG. 5D to the shift register 43. The timing signal preparing circuit 41 continuously outputs the signal D as shown in FIG. 5E to a decoder 44 after outputting the shift signal $\phi b$ until another printing signal Tp is input. The dot pattern signal corresponding to one column output from the character generator 3 is stored in the gate circuit 42. This data of 7 bits is supplied to the shift register 43 as the gate signal G is input, and is written in the shift register 43 as the writing signal $\phi a$ is input. The shift register 43 shifts the stored data every time the shift signal $\phi b$ is input, and sequentially outputs the stored data to a counter 45. The counter 45 counts data output from the shift register 43 and outputs the count to the decoder 44. While the signal D is input to the decoder 44, the decoder 44 decodes counts "1" to "7" of the counter 45 and outputs a signal "1" to one of AND circuits $46_1$ to $46_7$.

A time counter 47 counts the on-time preparing signal $\phi 1$ and outputs the count to a time decoder 48. When this count reaches a predetermined value a, the time decoder 48 produces an output to the AND circuit $46_1$. Every time the count becomes greater than the count a by a constant value ($a<b<c<d<e<f<g$), the time decoder 48 sequentially produces an output to the AND circuits $46_2$ to $46_7$. The outputs from the respective AND circuits $46_1$ to $46_7$ are input to the R input of an F/F 49 through an OR circuit 48 as a resetting signal. Thus, the F/F 49 outputs the on-time preparing signals N of durations of seven different steps from a minimum output duration Nmin shown in FIG. 5F to a maximum output duration Nmax shown in FIG. 5G, from the time the printing position signal Tp is input until the resetting signal is input.

The mode of operation of the circuit shown in FIG. 4 will now be described. Assume that data "H" is input to the character generator 3. When the first signal of the printing position signal Tp is output, the dot pattern signal is output from the character generator 3 and "1111111" is written in the gate circuit 42. Since the F/F 49 is set by the printing position signal Tp and the on-time signal N is output simultaneously, a voltage is applied to the printing elements $8_1$ to $8_7$ according to this dot pattern signal. Simultaneously, the gate signal G is output from the timing signal preparing circuit 41, and is supplied to the gate circuit 42, and the data output therefrom is written in the shift register 43 at the timing of the writing signal $\phi a$ output from the timing signal preparing circuit 41. Next, seven shift signals $\phi b$ are sequentially output from the timing signal preparing circuit 41. Each time a shift signal $\phi b$ is output, one bit of the data stored in the shift register 43 is supplied to the counter 45. The counter 45 counts the data and outputs the count to the decoder 44. When the seventh shift signal $\phi b$ is input, the 7-bit data stored in the shift register 43 is all output and the count of the counter 45 becomes "7". Subsequently, the signal D is output from the timing signal preparing circuit 41 to open the gate of the decoder 44 and the signal "1" is output to the AND circuit $46_7$. The on-time preparing signals $\phi 1$ are counted by the time counter 47. When the count reaches a predetermined value g, a signal output from the time decoder 48 resets the F/F 49 through the AND circuit $46_7$ and the OR circuit 48. The output of the on-time signal N is interrupted. As a result of this, a voltage is continuously applied to the printing elements $8_1$ to $8_7$ for the maximum output duration Nmax, and the first column of the letter "H" is printed on the recording paper sheet. When the second printing position signal is output, "0001000" is written in the gate circuit 42 and is counted by the counter 45 through the shift register 43. As a result, the signal "1" is output from the decoder 44 to the AND circuit $46_1$. The signal from the time decoder 48 resets the F/F 49 through the AND circuit $46_1$ and the OR circuit 48, so that the on-time signal N is output for the minimum output duration Nmin during which a voltage is applied to the printing element $8_4$ and the second column of the letter "H" is printed.

As in the case described above, the signal "1" is input to one of the AND circuits $46_1$ to $46_7$ according to the number of dots of the dot signal output from the character generator 3. Therefore, the output duration of the on-time signal N is accordingly controlled.

In the embodiment described above, the printing elements $8_1$ to $8_7$ are vertically arranged in a column in the printing head 8. However, the printing elements may be transversely arranged in a row.

According to the embodiment described above, the printing head has a plurality of printing elements arranged in a column. In addition to this, the on-time signal preparing circuit is incorporated which controls the duration for driving the printing elements according to the number of dots of the dot pattern signal output from the character generator. Therefore, even if the number of printing elements to be driven differs according to the column of the character to be printed, the printing distinctness may be made uniform for each column. Therefore, the printed characters have good legibility and appearance.

Figure 6:
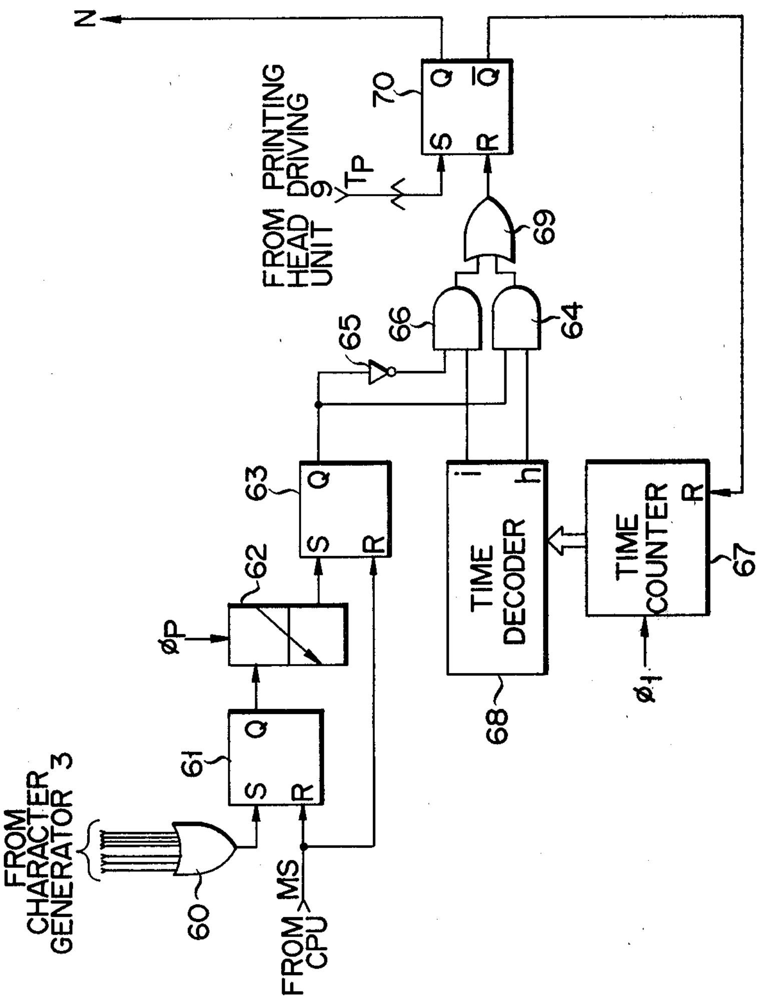
FIG. 6 is a circuit diagram showing still another embodiment of the on-time preparing circuit shown in FIG. 1.

FIG. 6 is a circuit diagram showing a third embodiment of the on-time signal preparing circuit 6. The dot pattern signal output from the character generator 3 is input through an OR circuit 60 to the S input of an RS type flip-flop (to be referred to as an F/F for brevity hereinafter) 61, the Q output of which sets a shift register 62. The shift register 62 outputs a setting signal to the S side input end of an F/F 63 when two timing signals $\phi p$ are input to the shift register 62. When starting the printing of one line with the printing head 8, a motor start signal MS is input from the CPU to the respective R side input ends of the F/Fs 61 and 63. The Q output of the F/F 63 is directly input to an AND circuit 64 and to an AND circuit 66 through an inverter 65. The binary code signal "0" is output from the Q output of the F/F 63 is input until the second timing signal $\phi p$ from the start of the printing. Thus, the binary code signal "1" is input to the AND circuit 66 through the inverter 65. After the third timing signal $\phi p$ is input the binary code the signal "1" is input from the Q output of the F/F 63 to the AND circuit 64 from the input of the third timing signal $\phi p$ until the input of the motor start signal MS.

The on-time preparing signal $\phi 1$ of a period shorter than that of the printing position signal Tp is input to a time counter 67, the count of which is output to a time decoder 68. Every time the count reaches a predetermined value h, the time decoder 68 outputs a resetting signal to the AND circuit 64. Every time the count reaches another predetermined value i greater than the predetermined value h, the time decoder 68 outputs a signal to the AND circuit 66. The signal output from the AND circuit 64 or the AND circuit 66 is input as the resetting signal to the R input of an F/F 70 through an OR circuit 69. The printing position signal Tp from the printing head drive unit 9 is input to the S side input end of the F/F 70. Every time the printing position signal Tp is input to the F/F 70, the F/F 70 is set and the on-time signal N is output from the Q side output end. Every time the resetting signal is input to the F/F 70, the resetting signal is output from the $\overline{Q}$ output end and clears the count of the time counter 67.

The mode of operation of this circuitry will now be described. Assume that the motor start signal MS indicating the initiation of the printing for one line is output from the printing head drive unit 9 to reset the F/Fs 61 and 63, and printing data including blanking codes "B" is written in the character buffer 1 as shown in FIG. 7. When the printing head is swept from the upper significant digits by the motor and the first timing signal $\phi$p is input to the character buffer 1, the blanking code "B" stored in the first digit of the character buffer 1 is read out and is input to the character generator 3 through the character decoder 2 as shown in FIG. 1. Subsequently, the first printing position signal Tp is input to the dot counter 4, and to the character generator 3 through the dot decoder 5. The data storing condition of the character generator 3 is as shown in FIG. 7. Thus, the dot signal is not output from the character generator 3, the F/F 61 is under the reset condition, and the printing head 8 is displaced by one digit without printing. Every time the blanking code "B" is output from the character buffer 1 by the timing signal $\phi$p, the same operation is executed.

The output of the blanking codes "B" stored in the character buffer 1 is completed. The numeral "1" is input by the next timing signal $\phi$p, and is input to the character generator 3 through the character decoder 2. Every time the printing position signal Tp is output, the dot pattern signal is output from each output line according to the count of the dot counter 4 and sets the F/F 61 through the OR circuit 60. The dot pattern signal is also applied to the printing elements $8_1$ to $8_7$ of the printing head 8 through the AND circuit array 7. As a result, the printing elements are heated and "1" following the blanking code "B" is printed on the recording paper sheet. Since the F/F 70 is reset after the count of the time counter 67 reaches the predetermined value i, the output of the on-time signal N is interrupted and the application of the voltage to the printing element $8_1$ to $8_7$ is interrupted. In this manner, every time the printing position signal Tp is output and the dot pattern signal is output, the on-time signal N is output for a constant period of time.

When the timing signal $\phi$p is output, the numeral "2" at the second digit is output from the character buffer 1. Simultaneously, the content of the shift register 62 is shifted. Since the binary code signal "1" is input from the F/F 61 to the shift register 62, the data stored in the shift register 62 becomes binary code signal "10". When the first printing position signal Tp is input, the data for the first column of the numeral "2" is output from the character generator 3. A voltage is applied to the printing elements $8_2$ and $8_7$ of the printing head 8 through the AND circuit 7 for a constant period of time as described above, thus completing printing on the recording paper sheet as shown in FIG. 8D. When the second to fifth printing position signals Tp are output, the data for the second to fifth columns of the dot pattern are output from the character generator 3 and the predetermined printing elements are sequentially driven for the constant period of time during which the on-time signal N is kept output. The sixth and seventh printing position signals Tp are then output and the printing of the numeral "2" is completed. In FIG. 8D, the output duration of the on-time signal N of the numeral "1" is the same as the output duration of the on-time preparing signal of the numeral "2"; therefore, it is omitted for the sake of simplicity.

When the timing signal $\phi$p is input next, the data for the numeral "3" is output from the character buffer 1. Simultaneously, the shift register 62 is shifted, the content of which becomes binary code signal "11", and sets the F/F 63. As a result, the signal "1" is input to the AND circuit 64 instead of to the AND circuit 66. When the first printing position signal Tp is input next, the data for the first column of the numeral "3" is output to the printing head 8 through the AND circuit array 7. Simultaneously, the time counter 67 starts counting the on-time preparing signals $\phi$1. When the count reaches the predetermined value h, the F/F 70 is reset by the signal output from the time decoder 68, the output of the on-time signal N is interrupted, and the time counter 67 is reset. As a result, the printing elements $8_1$ and $8_6$ are driven for a predetermined period of time during which the on-time signal N is output. Similarly, since the F/F 63 is under the set condition, every time the second to fifth printing position signals Tp are input, the dot pattern signal output from the character generator 3 is sequentially applied to the corresponding printing element of the printing head 8 for the predetermined period of time. The sixth and seventh printing position signals Tp are then output, thus completing the printing for the numeral "3". When the printing for the line is thus completed, the motor start signal MS is output from the printing head drive unit 9 for printing a new line to reset the F/Fs 61 and 63. Then, the signal "1" is input to the AND 64 instead of the AND circuit 66. In this manner, the on-time signal N of long duration is output from the time that printing of one line begins, and the first dot pattern signal is output from the character generator 3 until the first two characters of this one line have been printed. For the following digits of this line, the on-time signal N of shorter duration is output until the printing of this line is completed.

In the embodiment described above, the output duration of the on-time signal N for the first two characters of the line is made longer than that for the remaining characters. However, the number of characters for which the output duration of the on-time signal N is prolonged may be freely selected by changing the bit length of the shift register 62.

In the above embodiment, two kinds of the on-time signal N are used. However, three or more kinds of the on-time signal N may be prepared. Additionally, the on-time signal N may be sequentially switched from one with longer duration to one with shorter duration.

In summary, according to the present invention, the on-time signal preparing circuit is incorporated which makes the duration for applying the voltage to the printing elements longer than the usual duration up to a predetermined character, so that the cool printing elements may be heated sufficiently for printing the line. Therefore, the distinctness of each printed character of the line is uniform, and the printed characters may have good appearance and legibility. Since the voltage applied to the printing elements is not increased, the power consumption may be reduced to the minimum.

What we claim is:

1. A printing control device for a thermal printer, comprising:

buffer means for storing data to be printed;

character generating means coupled to said buffer means for generating, in a parallel mode, dot data of a dot pattern which corresponds to data read out of said buffer means;

printing means including a thermal printing head section coupled to said character generating means and having n printing elements, said thermal printing head section being adapted to apply a predetermined voltage to given ones of said printing elements corresponding to the dot data to be printed, which dot data are generated from said character generating means; and an on-time preparing circuit coupled to said thermal printing head section and to said character generating means including means for detecting, out of the dot pattern generated from said character generating means, the number of dots to be printed; and means for generating an on-time signal having a time width determined as a function of the number of detected dots, and for delivering said on-time signal to said thermal printing head section each time one dot printing is performed;

said printing means including means responsive to said on-time signal for controlling the time width of said predetermined voltage applied to the respective printing elements of said printing head section which correspond to the dot data to be printed.

2. The printing control device of claim 1, wherein said on-time preparing circuit generates an on-time signal whose time width is made longer when said detecting means thereof detects that the number of dots to be printed is greater than a predetermined number than when said detecting means detects that the number of dots to be printed is smaller than said predetermined number.

3. The printing control device of claim 1, wherein said on-time preparing circuit generates an on-time signal whose time width is made longer the greater the number of dots to be printed.

4. The printing control device of claim 1, wherein said on-time preparing circuit further includes a time counter adapted to be reset each time one dot is output and to start a time count operation, said time counter effecting a time count over the time width of said on-time signal which is determined according to the number of dots detected by said detecting means.

5. The printing control device of claim 4, wherein said on-time preparing circuit further includes a selection circuit coupled to said time counter for selecting, out of those count values counted by said time counter, one count value which is a function of the number of dots detected by said detecting means; and an output circuit for delivering an on-time signal to said thermal printing head section, for each dot printing, over a time width beginning from the start of a one-dot printing operation and continuing until the time count value corresponding to the number of dots is selected by said selection circuit.

6. The printing control device of claim 1, wherein said character generating means generates, out of an $m \times n$ dot matrix, dot pattern data in a sequential manner for each of n columns, said dot pattern data being read out of said buffer means; and said printing head section is adapted to be moved for each column in a direction of the width of a recording paper sheet and having n printing elements arranged in one line in a direction perpendicular to said direction of movement of said printing head section, a voltage being applied to the printing elements corresponding to, out of the dot pattern data sequentially generated from said character generating means, the number of dots to be printed, said voltage being applied over a time width corresponding to the width of said on-time signal.

7. The printing control device of claim 1, wherein said character generating means generates, out of an $n \times l$ dot matrix, dot pattern data in a sequential manner for each of n rows, said dot pattern data being read out of said buffer means; and said printing head section has n printing elements arranged in one line in a direction perpendicular to the movement of a recording paper sheet, a voltage being applied to the printing elements corresponding to, out of the dot pattern data sequentially generated from said character generating means, the dots to be printed, said voltage being applied over a time width corresponding to the width of said on-time signal.

8. A printing control device for a thermal printer, comprising:

buffer means for storing data to be printed;

character generating means coupled to said buffer means for generating, in a parallel mode, dot data of a dot pattern in such a manner to correspond to data read in one digit unit out of said buffer means;

printing means including a thermal printing head section coupled to said character generating means and having n printing elements adapted for movement in a direction of the width of a heat-sensitive recording paper sheet, said thermal printing head section being adapted to apply a predetermined voltage to given ones of said printing elements corresponding to the dot pattern data generated from said character generating means and to print a character on said heat-sensitive recording paper sheet; and an on-time preparing circuit coupled to said thermal printing head section and including means for detecting, out of the data to be printed, the head data which is printed and for detecting the number of digits of now printing data from said head data; and means for generating an on-time signal having a time width determined as a function of the number of detected digits, and for delivering said on-time signal to said thermal printing head section each time one dot is printed;

said printing means including means responsive to said on-time signal for controlling the time width of said predetermined voltage applied to the respective printing elements of said printing head section.

9. The printing control device of claim 8, wherein said on-time preparing circuit generates an on-time signal whose time width is made longer when said detecting means thereof detects that the number of digits is smaller than a predetermined number of digits than when said detecting means detects that the number of digits is greater than said predetermined number of digits.

10. The printing control device of claim 8, wherein said on-time preparing circuit generates an on-time signal whose time width is made longer the smaller the number of digits detected by said detecting means of said on-time preparing circuit.

11. The printing control device of claim 8, wherein detecting means of said on-time preparing circuit includes means for detecting that head data of the data is printed; and wherein said on-time preparing circuit further includes a time counter adapted to be reset each time one dot data is output, said time counter counting the time width of said on-time signal which is determined according to the number of digits detected by said detecting means.

12. The printing control device of claim 11, wherein said on-time preparing circuit further includes a selection circuit coupled to said time counter for selecting, out of those count values counted by said time counter, one count value which is a function of the number of digits detected by said detecting means; and an output circuit for delivering an on-time signal to said thermal printing head section, for each one dot printing, over a time width beginning from the start of a one-dot printing operation and continuing until a count value corresponding to the number of digits is selected by said selection circuit.

* * * * *

UNITED STATES PATENT AND TRADEMARK OFFICE

CERTIFICATE OF CORRECTION

PATENT NO. : 4,409,599

DATED : October 11, 1983

INVENTOR(S) : Takeshi YASUDA et al

It is certified that error appears in the above-identified patent and that said Letters Patent is hereby corrected as shown below:

Column 8, line 37, before "64", insert --circuit--.

Signed and Sealed this

*First* Day of *May 1984*

[SEAL]

*Attest:*

GERALD J. MOSSINGHOFF

*Attesting Officer* *Commissioner of Patents and Trademarks*